US012103768B2

(12) United States Patent
Martin, II et al.

(10) Patent No.: US 12,103,768 B2
(45) Date of Patent: Oct. 1, 2024

(54) LOCKING DEVICE AND RELATED METHODS

(71) Applicant: Serio-Us Industries, Inc., Baltimore, MD (US)

(72) Inventors: James L. Martin, II, Gambrills, MD (US); David L. Reeb, Sykesville, MD (US)

(73) Assignee: Serio-Us Industries, Inc., Baltimore, MD (US)

(*) Notice: Subject to any disclaimer, the term of this patent is extended or adjusted under 35 U.S.C. 154(b) by 381 days.

(21) Appl. No.: 17/491,019

(22) Filed: Sep. 30, 2021

(65) Prior Publication Data

US 2022/0106112 A1 Apr. 7, 2022

Related U.S. Application Data

(60) Provisional application No. 63/086,212, filed on Oct. 1, 2020.

(51) Int. Cl.
*B65F 1/16* (2006.01)
*E05B 15/00* (2006.01)
*E05B 17/20* (2006.01)

(52) U.S. Cl.
CPC ........ *B65F 1/1615* (2013.01); *E05B 15/0093* (2013.01); *E05B 17/2007* (2013.01); *B65F 2210/148* (2013.01)

(58) Field of Classification Search
CPC .... Y10T 292/1006; B65F 1/02; B65F 1/1646; B65F 1/1615; B65F 2210/148; E05B 15/0093; E05B 63/0052; E05B 2047/0075; E05B 2047/0078; E05C 19/003
See application file for complete search history.

(56) References Cited

U.S. PATENT DOCUMENTS

| | | | | |
|---|---|---|---|---|
| 4,155,584 A * | 5/1979 | Pracchia | B65F 1/1615 | 414/407 |
| 5,015,021 A * | 5/1991 | Wyson | B65F 1/1615 | 292/230 |
| 5,149,153 A * | 9/1992 | Drewry | B65F 1/1615 | 292/341.15 |

(Continued)

FOREIGN PATENT DOCUMENTS

| | | | |
|---|---|---|---|
| AT | 211739 B * | 1/1959 | |
| CA | 2953377 A1 * | 6/2017 | B65F 1/122 |

(Continued)

OTHER PUBLICATIONS

Top 10 square fonts for designers; webdesigndev.com Sep. 21, 2019; Wayback Machine (Year: 2023).*

*Primary Examiner* — Kristina R Fulton
*Assistant Examiner* — Steven A Tullia
(74) *Attorney, Agent, or Firm* — CALDERON SAFRAN & WRIGHT P.C.

(57) ABSTRACT

The locking device is provided for waste containers. The locking device allows the lid of the container, when the container is in an upright position, to be locked to prevent unauthorized access to the container. When the container is tilted from the upright position, e.g., to empty the contents of the container, the locking device is gravity actuated to allow the lid to open automatically. The locking device is also provided with a manual release for manually opening the container.

14 Claims, 20 Drawing Sheets

(56) References Cited

U.S. PATENT DOCUMENTS 5,201,434 A * 4/1993 DeVivo .................. B65F 1/122 292/237
5,224,744 A * 7/1993 Michelutti ............ B65F 1/1615 292/234
5,474,341 A * 12/1995 Putman ................. B65F 1/1615 414/407
5,490,606 A * 2/1996 Lombardo .............. B65F 1/004 220/908
5,662,364 A * 9/1997 Reeb ..................... B65F 1/1615 292/230
5,772,061 A * 6/1998 Lowe .................... B65F 1/1615 220/908
7,988,009 B2 * 8/2011 Cavalcante ............. B65F 1/141 220/908
8,550,282 B1 * 10/2013 Libhart ................. B65F 1/1615 220/264
8,960,735 B2 * 2/2015 Michael .................... E05C 3/24 292/216
9,303,439 B2 * 4/2016 Kreitzer ................ B65F 1/1615
9,975,695 B2 * 5/2018 Reeb ..................... E05C 19/005
10,781,041 B2 * 9/2020 Reeb ..................... B65F 1/1646
10,900,255 B2 * 1/2021 Fink ...................... B65F 1/1615
2009/0066092 A1 3/2009 Reeb
2009/0091141 A1 * 4/2009 Kreitzer ................ B65F 1/1615 292/130
2010/0102575 A1 * 4/2010 Ferkovich ............. B65F 1/1615 292/259 R
2015/0035288 A1 * 2/2015 Fink ...................... B65F 1/1615 292/2
2015/0314957 A1 11/2015 Reeb
2016/0355334 A1 12/2016 Reeb et al.
2017/0190509 A1 7/2017 Reeb et al.
2017/0320665 A1 11/2017 Reeb et al.
2019/0055085 A1 * 2/2019 Hodge .................. E05B 67/383
2019/0106278 A1 4/2019 Reeb et al.
2020/0115156 A1 * 4/2020 Hodge .................. B65F 1/1615
2021/0094758 A1 * 4/2021 Reeb ..................... B65F 1/1646
2021/0269237 A1 * 9/2021 Martin, II ................. E05C 3/12

FOREIGN PATENT DOCUMENTS

CA 2990242 A1 * 6/2019 ............ B65F 1/1615
DE 19502347 A1 * 8/1996 ............ B65F 1/1615
DE 29610430 U1 * 7/1997 ............ B65F 1/1615
DE 19523056 C2 * 4/1998 ............ B65F 1/1615
DE 19833882 A1 * 2/2000 ............ B65F 1/1615
DE 29623962 U1 * 1/2001 ............ B65F 1/1615
EP 716989 A1 * 6/1996 ............ B65F 1/1615
EP 1050490 A1 * 11/2000 ............ B65F 1/1615
EP 1081063 A1 * 3/2001 ............ B65F 1/1615
EP 1396446 A1 * 3/2004 ............ B65F 1/1615
EP 3945042 A1 * 2/2022 ............ B65F 1/1615
GB 2446067 A * 7/2008 ............ B65F 1/1615
WO WO-2005111348 A1 * 11/2005 ............ B65F 1/1615
WO WO-2010054616 A1 * 5/2010 ......... E05B 15/0093

* cited by examiner

LOCKING DEVICE AND RELATED METHODS

CROSS-REFERENCE TO RELATED APPLICATIONS AND CLAIM TO PRIORITY

This application is related to and claims the priority of U.S. Provisional Patent Application No. 63/086,212, filed Oct. 1, 2020, which is incorporated herein by reference.

FIELD OF THE INVENTION

The present invention generally relates to waste containers and, more particularly, to a locking device for waste containers. The locking device is gravity actuated to an opened position on tilting of the container for dumping. The invention is also directed to methods of assembling and using the locking device.

BACKGROUND OF THE INVENTION

As is well known, waste containers, such as refuse containers for use in residential and industrial applications typically include a container supported on a base structure. With the advent of mechanized trash removal, there have been created a number of large sized trash bins or dumpsters. These containers usually comprise a block-shaped or pyramid-shaped container with a hinged lid attached to one side thereof. The container further includes attachments for accommodating various lifting mechanisms of a trash removal vehicle. Each container is lifted by the lifting mechanism of the trash removal vehicle and pivoted in some fashion, so that the hinged top of the container opens, and the trash contained therein may be emptied into the vehicle. The container is then returned to a position on the ground, and the hinged lid closes on top of the container. Many of these large trash receptacles are rented from a trash removal service. These receptacles or their emptying are usually not provided free of charge and, consequently, their frequent emptying and service can become a considerable expense. This expense is increased when unauthorized users deposit trash therein, which necessitates a more frequent emptying of the container. Of course, the unauthorized user does not contribute to the increased expense attributable to the need for more frequent dumping. The expense, thus, is wholly borne by the authorized user(s).

In order to reduce the added expense that comes from unauthorized use, the dumpster may be locked. While conventional chains and padlocks reduce unauthorized dumpster use, they also add to operating expenses, because the driver of the truck emptying the dumpster must get out of the truck to unlock the padlock on the dumpster and then reverse the process after emptying. For decades, companies have been developing and marketing dumpster locking mechanisms that open automatically when the dumpster is lifted and inverted to dump the trash into the truck. With such an automatic lock, the driver is not required to leave the truck, which saves the trash company hundreds of dollars each year.

Conventional automatic locks are typically bulky, expensive and difficult to mount to multiple containers. Since containers come in a variety of shapes and sizes, it is important that the locking device be sized and shaped to be retrofit onto a variety of existing containers. Moreover, the locking device must be able to withstand the rigors of everyday, outdoor use in the waste environment.

Therefore, there exists a need for an automatic locking device that improves upon prior automatic locking devices and solves the problems inherent in known automatic locking devices.

SUMMARY OF THE INVENTION

A first aspect of the invention provides a locking device for a container having a hinged lid. The container has a hinged lid that is movable between an upright storing position and a tilted dumping position for emptying the container. The locking device allows the lid of the container, when the container is in an upright position, to be locked to prevent unauthorized access to the container. When the container is tilted from the upright position, e.g., to empty the contents of the container, the locking device is gravity actuated to unlock and allow the lid to open automatically.

The locking device contains a base unit and a pivotable unit pivotally mounted to the base unit. The base unit is adapted to be fixed to the container and contains a locking mechanism therein. The locking mechanism includes a cam, a rolling member, and a manual release housed inside the base unit. The cam is fixed to the pivotable unit via a shaft. The rolling member rolls between a blocked position and a release position within an angled slot. In the blocked position the rolling member blocks the cam from rotating, thereby blocking rotation of the pivotable unit to the opened position away from the lid. In the release or unlock position, the rolling member allows the cam to rotate, thereby allowing the pivotable unit to rotate to the opened position. A manual release allows a user to manually put the rolling member into the release position.

A second aspect of the invention is a container having a hinged lid over an opening in the container and a locking device mounted to a first side wall of the container. A pivoting arm is mounted to a second side wall, opposing the first side wall. A locking bar connects the pivotable unit and the pivoting arm. In the closed position, the locking bar is positioned over the hinged lid to prevent it from opening. In the open position, the locking bar is spaced away from the hinged lid to allow it to be lifted away from container, thereby opening the container.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The accompanying drawings are incorporated in and constitute a part of the specification. The drawings, together with the general description given above and the detailed description of the exemplary embodiments and methods given below, serve to explain the principles of the invention. The objects and advantages of the invention will become apparent from a study of the following specification when viewed in light of the accompanying drawings, in which like elements are given the same or analogous reference numerals and wherein.

DETAILED DESCRIPTION OF THE PREFERRED EMBODIMENT(S)

Figure 1:
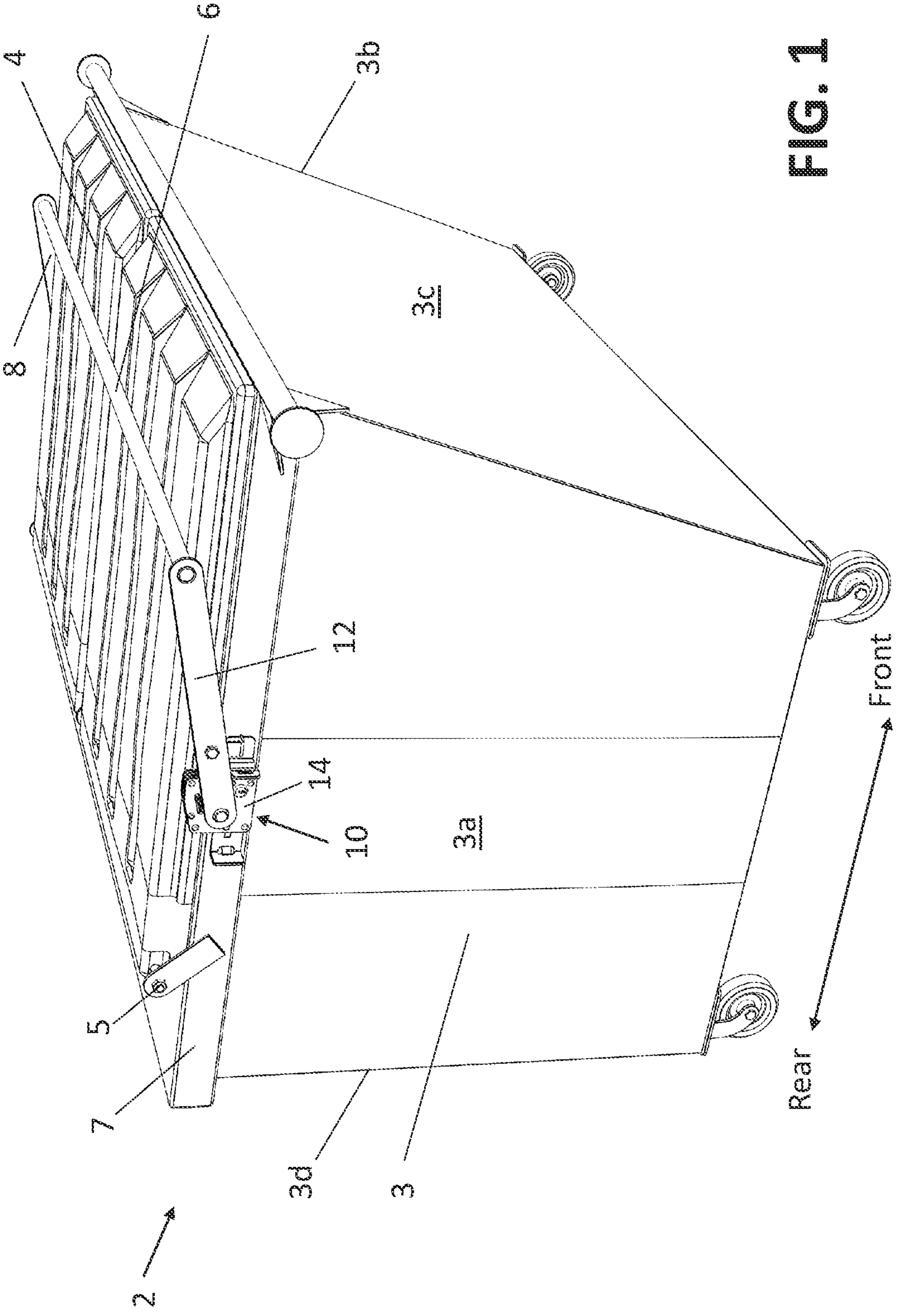
FIG. 1 is a perspective view from the locking side of a waste container in an upright position in a closed position.

Reference will now be made in detail to exemplary embodiments and methods of the invention as illustrated in the accompanying drawings, in which like reference characters designate like or corresponding parts throughout the drawings. It should be noted, however, that the invention in its broader aspects is not limited to the specific details, representative devices and methods, and illustrative examples shown and described in connection with the exemplary embodiments and methods.

This description of exemplary embodiments is intended to be read in connection with the accompanying drawings, which are to be considered part of the entire written description. In the description, relative terms such as "horizontal," "vertical," "up," "down," "upper", "lower", "right", "left", "top", "bottom", "forward", and "backward" as well as derivatives thereof (e.g., "horizontally," "downwardly," "upwardly," etc.) should be construed to refer to the orientation as then described or as shown in the drawings. These relative terms are for convenience of description and normally are not intended to require a particular orientation. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. Additionally, the word "a" and "an" as used in the claims means "at least one" and the word "two" as used in the claims means "at least two".

Figure 2:
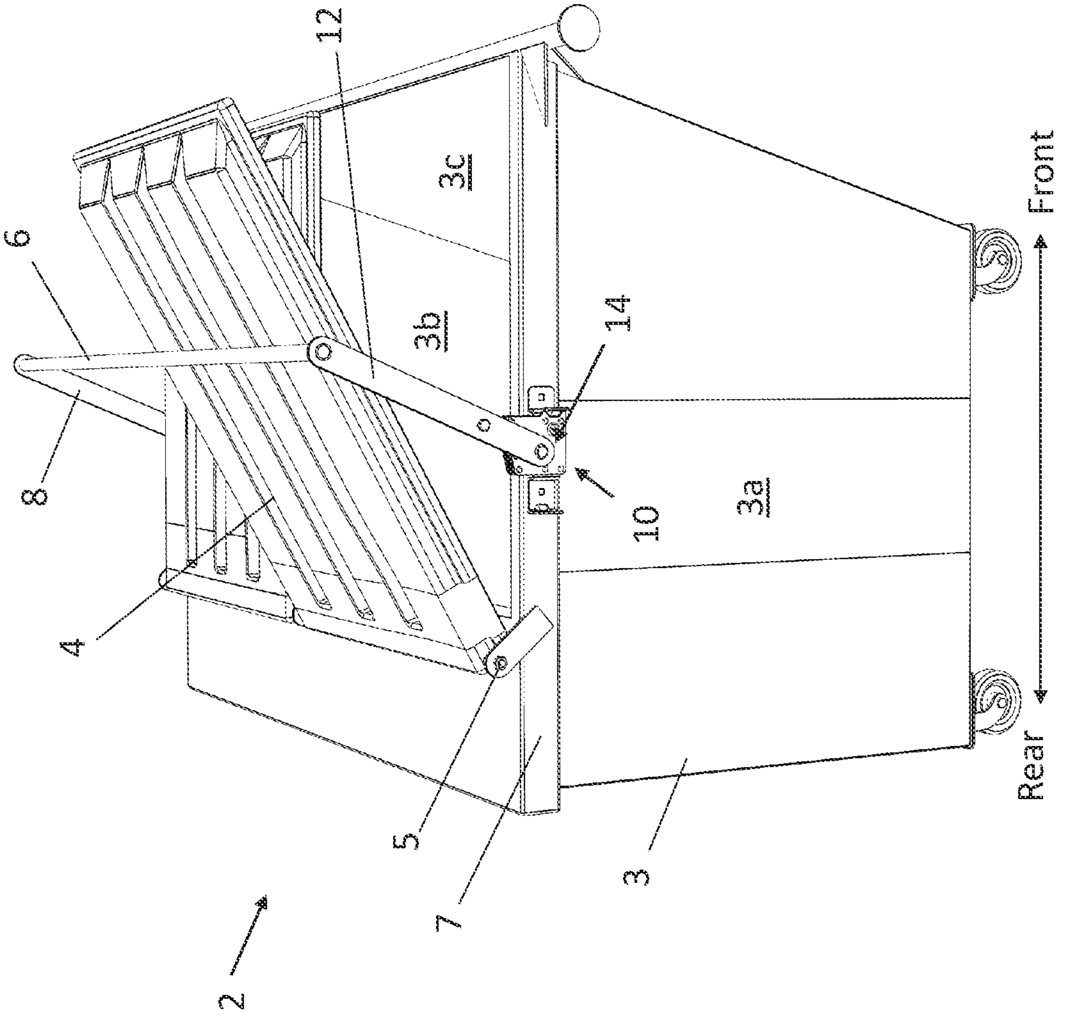
FIG. 2 is a perspective view from the locking side of the waste container in an upright position with the lid and the locking bar in an intermediate open position.
Figure 3:
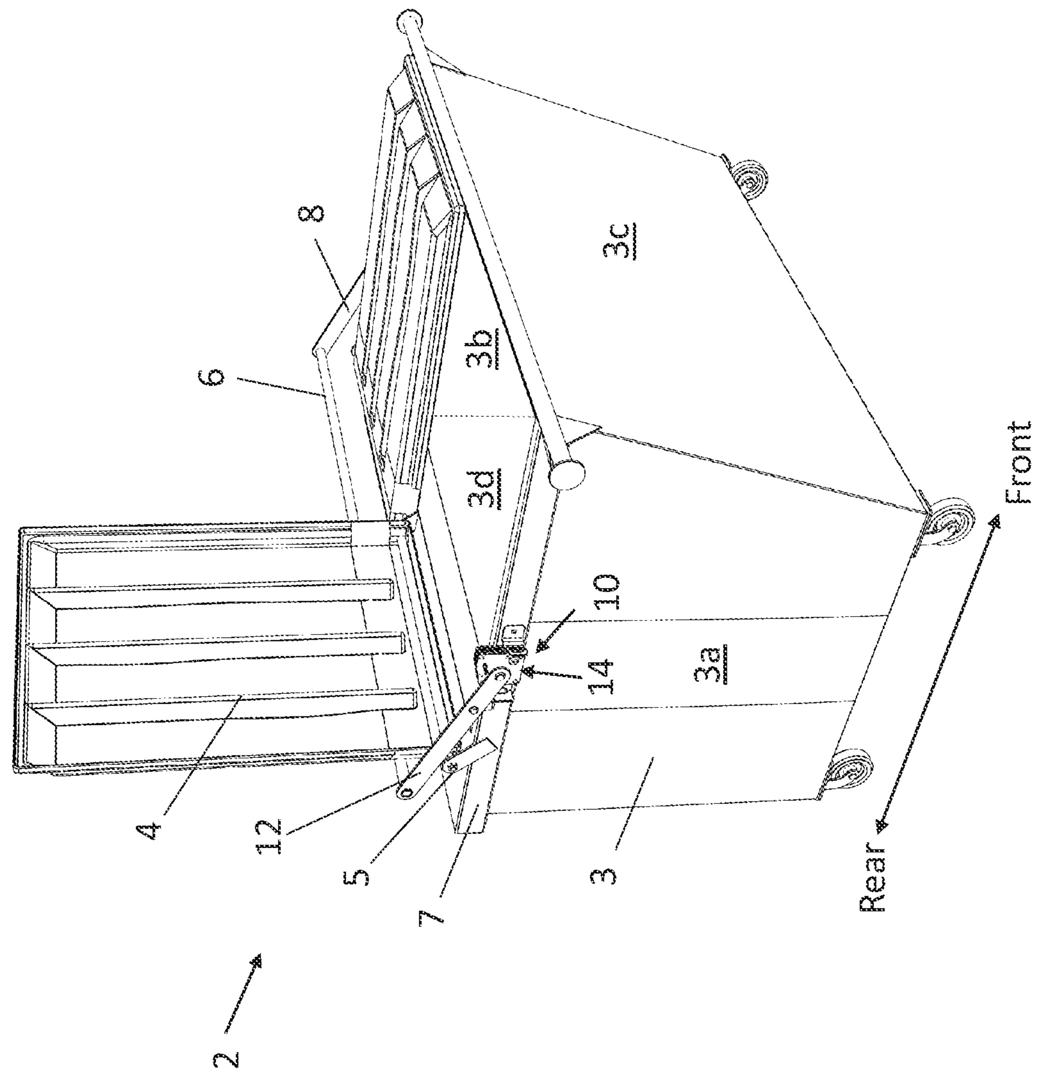
FIG. 3 is a perspective view from the locking side of the waste container in an upright position with the lid and the locking bar in a fully open position.

FIGS. 1-3 illustrate a container 2, such as a trash collector or dumpster, including a container body 3, at least one hinged lid 4 pivotally mounted thereto, a safety locking device 10, and a locking bar 6 extending across the top of the waste container 2. The lid 4 is mounted to the container 2 by a hinge 5 and covers the top of the container body 3. The lid 4 may be opened by lifting its front end away from the container body 3 (see FIG. 2) and toward the rear of the container body 3. Although FIGS. 1-3 show the lid 4 as two separate pieces that may be opened independently of each other, the lid 4 may also be a single piece or more than two pieces. The locking bar 6 is pivotable between a locked position where it lays on top of the lid 4 and blocks the lid 4 from lifting away from the container body 3 (see FIG. 1), and an open position where it is away from the lid 4 allowing the lid 4 to be lifted away from the container body 3 (see FIGS. 2-3). The locking bar 6 may be pivoted from the locked position to the open position by lifting the bar 6 away from and toward the rear of the container 2. The locking bar 6 may occupy two different open positions: an intermediate open position as shown in FIG. 2 or a fully open position as shown in FIG. 3. The intermediate position is useful for deposits of small items into the container 2 without requiring the user to open locking bar 6 to the fully open position. The fully open position is useful for deposits of larger items which cannot fit into the opening provided by the lid 4 in the intermediate position.

The locking device 10 is provided for locking and unlocking the hinged lid 4 of the container 2 to prevent unauthorized access to container 2. The locking bar 6 extends between the locking device 10 at one side and a pivoting arm 8 at the other side. The locking device 10 is preferably mounted to a side wall 3*a* of the container body 3 (herein defined as a lock side of the container body 3), while the pivoting arm 8 is preferably pivotally mounted to the opposite side on wall 3*b* (herein defined as a dummy side of the container body 3). The container 2 also has a front wall 3*c* and opposing back wall 3*d*. Although the drawings show the lock side as the right side of the container body 3 and the dummy side (for mounting a support member) as the left side of the container body 3, the reverse is also within the scope of the present invention, where the lock side is the left side of the container body 3 and the dummy side is the right side of the container body 3. The lock side and the dummy side may be located anywhere on the container 2 as long as the locking bar 6 may be positioned over the lid 4 to block the opening of the container 2, and be moved so as to be spaced from the lid 4 to allow opening of the container 2. The locking device 10 may be mounted to a flanged lip 7 of the container body 3 or directly to a side of the container body 3. The container body 3 typically is made of steel, so the locking device may be secured to the container body by welding or through mechanical fasteners.

The container 2, as illustrated in FIGS. 1-3, may be an industrial-type dumpster used for retaining, storing, and eventually disposing of refuse (waste). The container 2 may be tilted or otherwise pivoted from an upright (or on-the-ground) position (where the waste container 2 is sitting generally horizontally on the ground) (shown in FIG. 1) to a tilted or dumping position.

Figure 4:
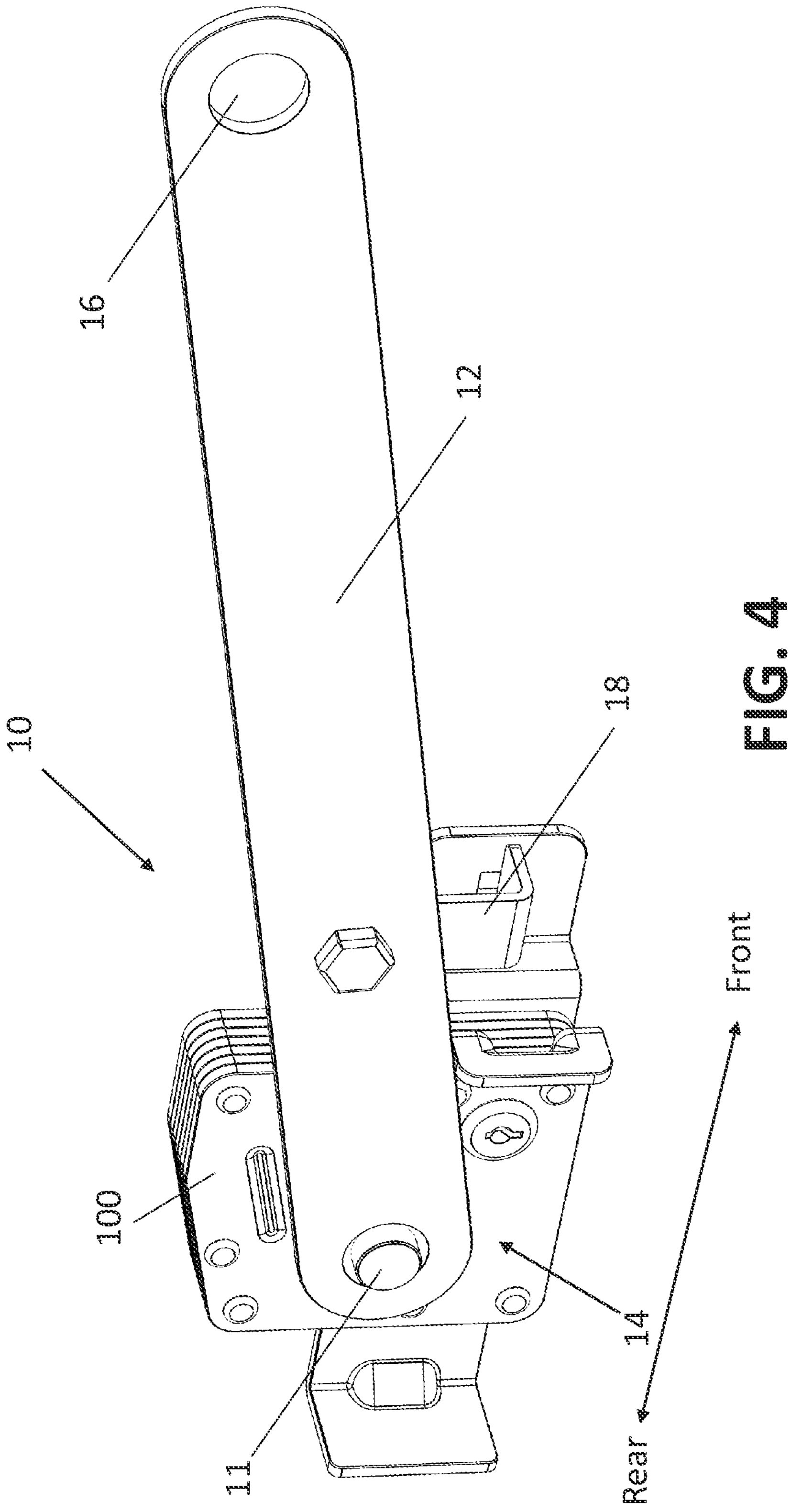
FIG. 4 is a perspective view of a locking device from the outside.
Figure 5:
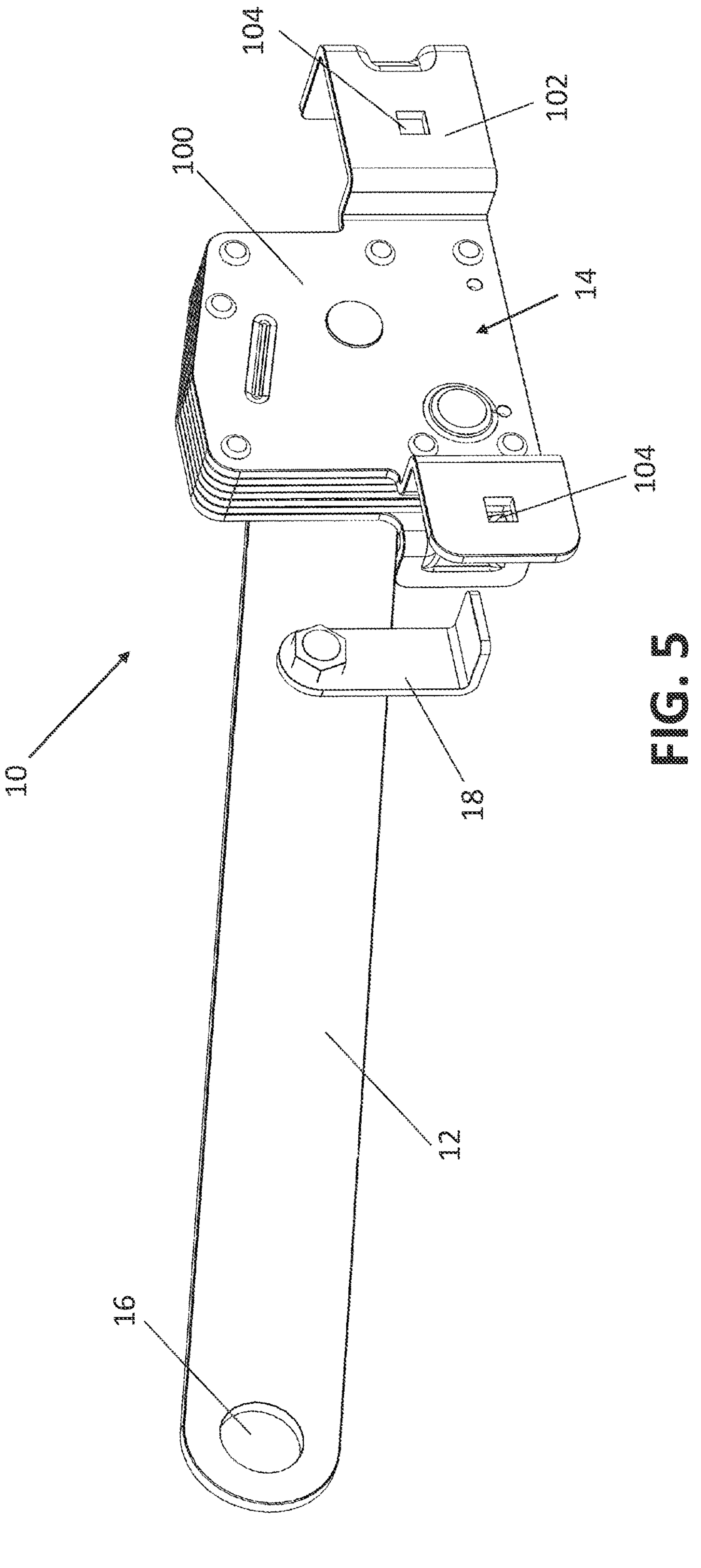
FIG. 5 is a perspective view of the locking device from the inside.
Figure 6:
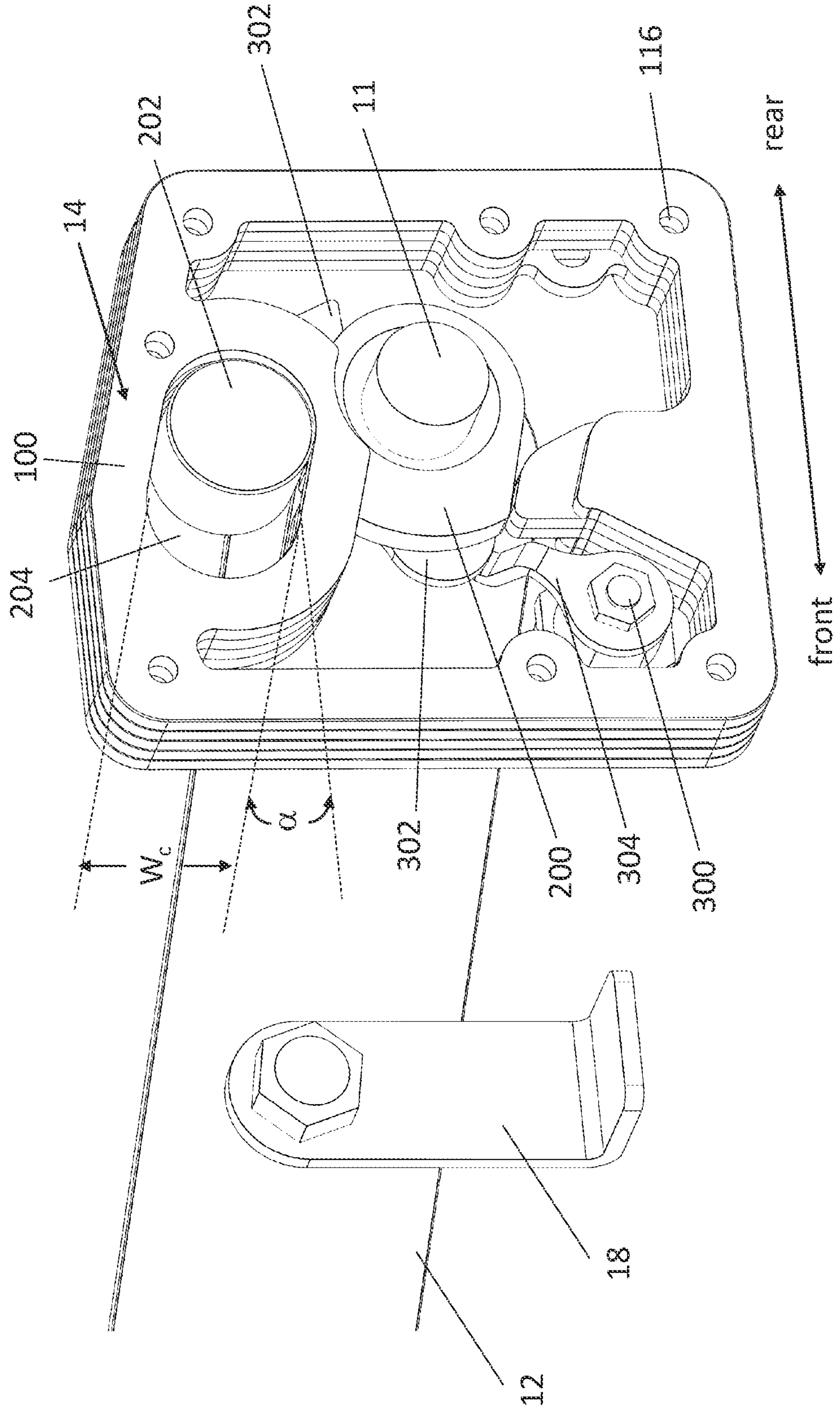
FIG. 6 is a perspective view of the locking device from the inside with the inner plate removed.

As best shown in FIGS. 4-9, the locking device 10 contains a base unit 14 and a pivotable unit 12 pivotally coupled to the base unit 14. The pivotable unit 12 is preferably a bar having one end that is pivotally coupled to the base unit 14 by a shaft 11 fixed to the pivotable unit. The shaft 11 allows the pivotable unit 12 to rotate relative to the base unit 14 by pivoting around the center axis of the shaft 11. The shaft 11 includes a cam 200 along at least a portion of a perimeter thereof, as best shown in FIG. 6.

Figure 18:
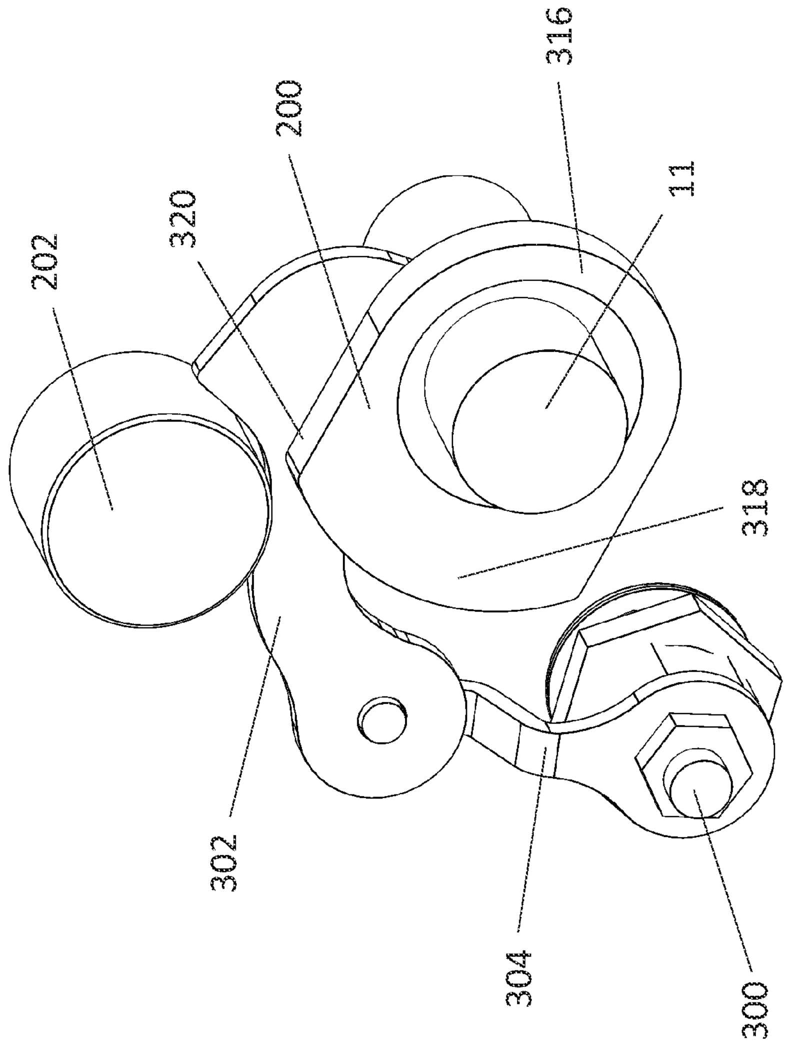
FIG. 18 is a partial view of the locking device showing the cam.

According to an exemplary embodiment of the present invention, the cam 200 is formed on or fixed to the perimeter of the shaft 11, such that the cam 200 rotates with the rotation of the shaft 11. The cam 200 may, partially or entirely, encircle the shaft 11. The pivotable unit 12 and the cam 200 are fixed to the shaft 11, so that rotation of the pivotable unit 12 around the center axis of the shaft 11 also rotates the shaft 11 and the cam 200, i.e., the pivotable unit 12, the shaft 11, and the cam 200 rotate together as a single unit. The pivotable unit 12 and the cam 200 are fixed to the shaft 11, e.g., by welding or being formed as one piece (cut from a single block of material). The cam 200 is preferably an elongate flat plate having one end fixed to the shaft 11 and extending perpendicularly therefrom. Preferably, the cam 200, as shown in FIG. 18, is a flat U-shaped plate having a round end (bottom of the U) 316 and an opposing broad end 318. The shaft 11 is fixed to the cam 200 proximate the round end 316. The distance between the shaft 11 and the broad end 318 is greater than the distance between the shaft 11 and the round end 316, such that, as explained below, when the rolling member 202 is in its blocked position, the side edge 320 of the cam 200 abuts the rolling member 202 to block rotation of the cam 200 (note that FIG. 18 shows the rolling member 202 in its release position).

The other end of the pivotable unit 12 preferably contains a hole 16 for coupling to the locking bar 6 (see FIGS. 1-5), when the locking device 10 is mounted on the waste container 2. Preferably, the locking bar 6 is retained in the hole 16 of the pivotable unit 12 and extends approximately perpendicularly to the plane of the pivotable unit 12. The locking bar 6 may be retained in the hole 16 by welding or friction. Because the locking bar 6 is coupled to the pivotable unit 12, movement of the locking bar necessitates rotation of the pivotable unit 12.

As best shown in FIGS. 4-5, the base unit 14 includes a locking mechanism that is located in the interior of housing 100. The base unit 14 also includes a mounting plate 102 for attaching the base unit 14 to the container body 3. The mounting plate 102 preferably contains one or more through holes 104 for attaching the base unit 14 to the container 2 with mechanical fasteners, such as screws, nuts/bolts, or rivets.

The locking mechanism includes the cam 200 and a rolling member 202 contained inside the housing 100. The rolling member 202 is contained in a slot 204 that is angled relative to the horizontal (see FIGS. 6 and 9), so that the front of the slot is higher than the rear. The slot 204 is preferably angled toward the front at an angle $\alpha$ (see FIG. 6) of about 10 to 60° relative to the horizontal, more preferably about 10 to about 20°. The angle $\alpha$ is such that, when the locking device 10 is in its upright and locked position, the rolling member 202 is pulled by gravity to the bottom (or rear end) of the slot 204 (see FIG. 6); and when the locking device 10 is sufficiently tipped forward (tipped forward at an angle greater than $\alpha$), gravity pulls the rolling member 202 to the top (or forward end) of the first slot 204 (see FIG. 13).

Figure 8:
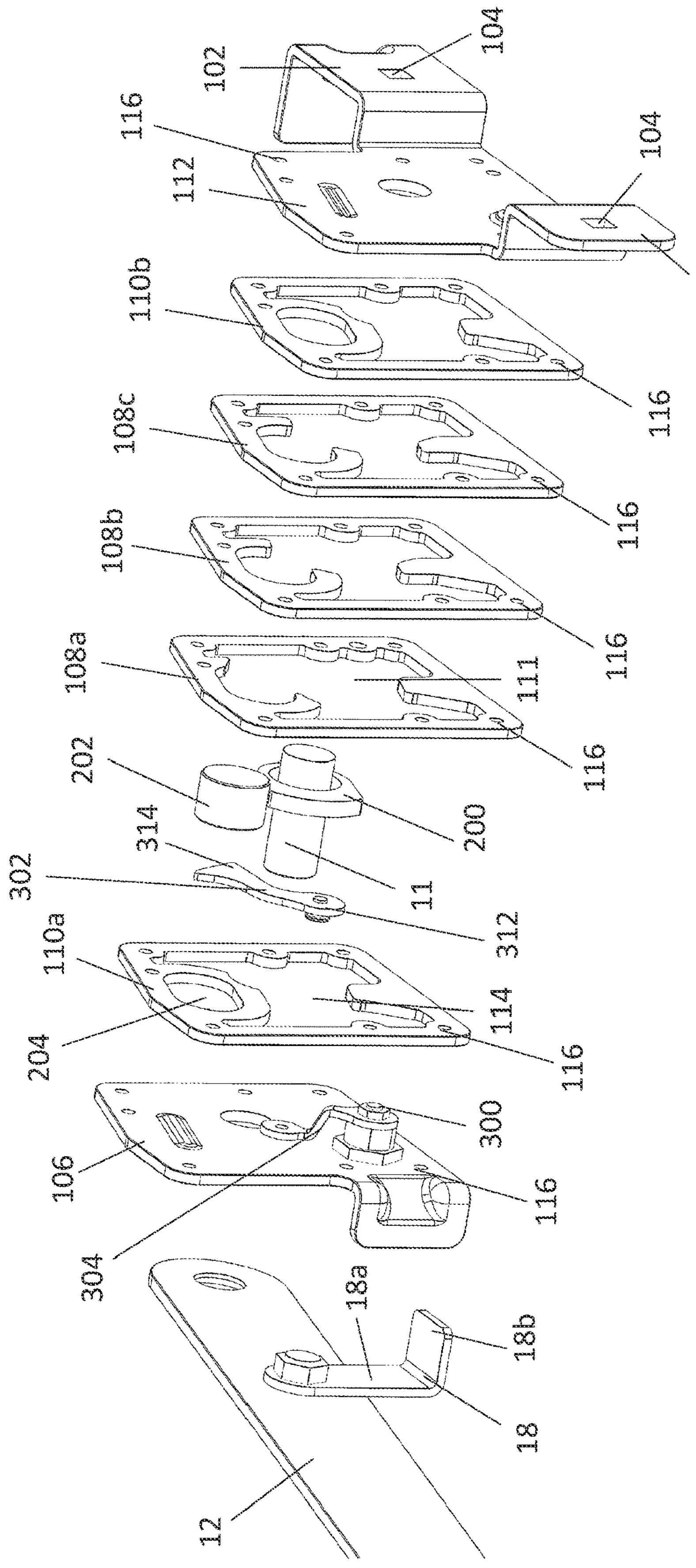
FIG. 8 is an exploded view of the locking device.
Figure 13:
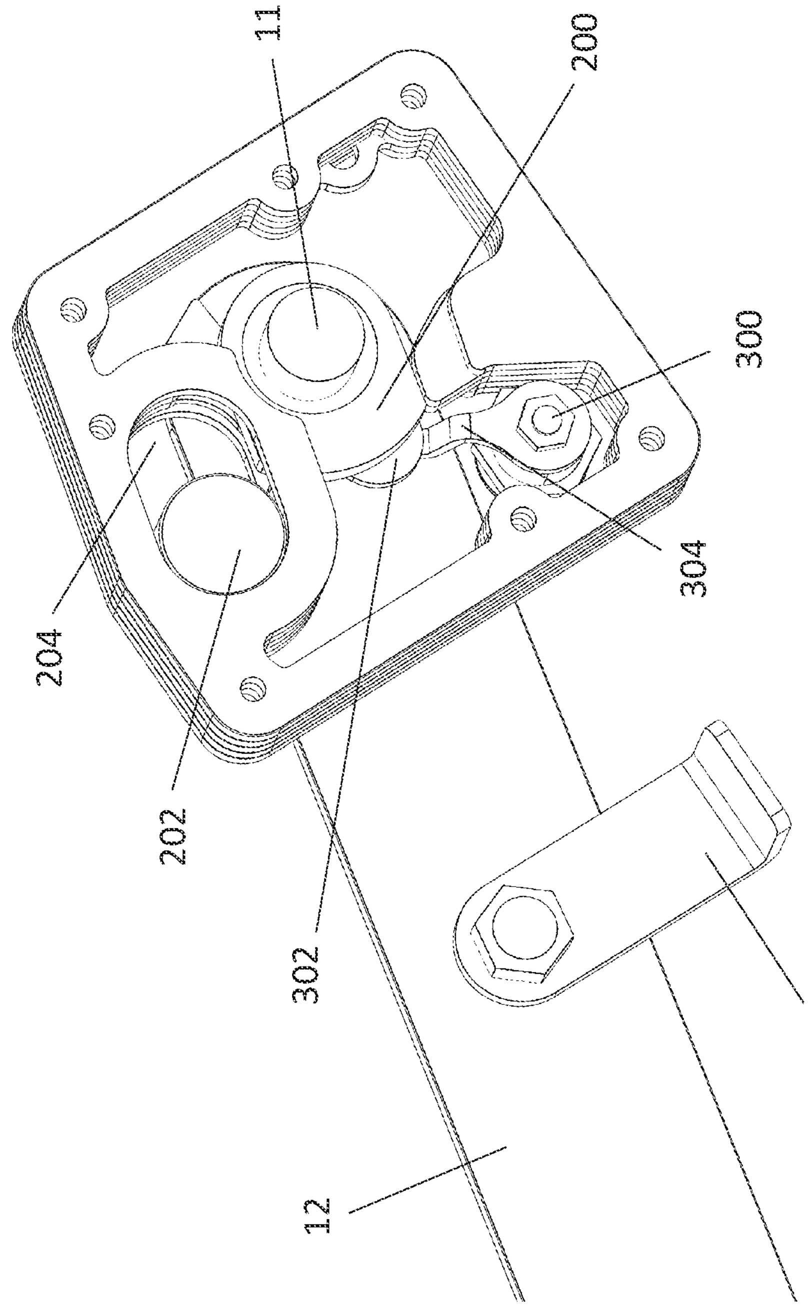
FIG. 13 is the same view as FIG. 7 with the locking unit tilted so that the rolling member is in its release position.

The rolling member 202 may be in the form of a cylinder, as best shown in FIG. 8, and is preferably made from a metal, such as steel. Alternatively, the rolling member 202 may be in the form of a ball, capable of rolling within the slot 204. It will be appreciated that the diameter of the rolling member 202 is the same as or slightly smaller than width We of the slot 204 (see FIG. 6), such that the rolling member 202 can roll freely within the slot 204. As explained below, when the rolling member 202 is located at the bottom of the slot 204, it blocks the cam 200, and thus the pivotable unit 12, from rotating clockwise (as shown in FIG. 6) (the blocked position); and when the rolling member 202 is located at the top of the slot 204, the cam 200, and thus pivotable unit 12, may freely rotate in the clockwise direction (as shown in FIG. 13) (the release position).

As best shown in FIG. 8, the housing 100 is preferably made up of several flat plates which are assembled to form the housing 100. The plates may be assembled together with mechanical fasteners, such as rivets, bolts/nuts, or screws, without requiring welds. The plates include an outer plate 106, framing plates 108*a*, 108*b*, and 108*c*, rolling plates 110*a* and 110*b*, and an inner plate 112. The outer plate 106 is the outermost plate farthest from the container 2 when the locking device 10 is mounted on the container 2. The inner plate 112 is the innermost plate locating adjacent to the container 2 when the locking device 10 is mounted on the container 2. As used herein, "inner," "inner side," or the like refers to the side of the locking device that is closest to the container 2, when the locking device 10 is mounted on the container 2; and "outer," "outer side," or the like refers to the side of the locking device that is farthest from the container 2 when the locking device 10 is mounted on the container 2. Between the inner plate 112 and the outer plate 106, from outside (the side closest to the outer plate 106) in, are the first rolling plate 110*a*, the first framing plates 108*a*, the second framing plate 108*b*, the third framing plate 108*c*, and the second rolling plates 110*b*. Thus, the framing plates 108*a*, 108*b*, and 108*c* are located at the center and adjacent to each other; the rolling plate 110*a* is adjacent to the framing plate 108*a*; the rolling plate 110*b* is adjacent to the framing plate 108*c*. Because the framing plates 108*a*, 108*b*, and 108*c* are mirror images of each other, only one plate (referred to as reference numeral 108) will be discussed in detail below. The same is also true of the rolling plates 110*a* and 110*b*.

As best shown in FIG. 8, the framing plate 108 has a hollow center 111, and frames the perimeter of the housing 100. The rolling plate 110 also frames the perimeter of the housing 100, but in addition to the hollow center 114, the rolling plate 110 also contain a cut out forming the slot 204 above the hollow center 114 for receiving the rolling member 202.

Each of the plates 106, 108*a*, 108*b*, 108*c*, 110*a*, 110*b*, and 112 preferably contains matching holes 116, as best shown in FIGS. 6 and 8, for assembly of the housing by fasteners. For assembly, the plates 106, 108*a*, 108*b*, 108*c*, 110*a*, 110*b*, and 112 are stacked so that matching holes 116 are aligned with each other; and fasteners, such as rivets, are inserted through the holes 116 to secure the plates together. The order of the plates from the outer side to inner side, as best shown in FIG. 8, is as follows: outer plate 106, first rolling plate 110*a*, first framing plate 108*a*, second framing plate 108*b*, third framing plate 108*c*, second rolling plate 110*b*, and inner plate 112. Once assembled, the plates form the housing 100. The inner and outer sides of the housing 100 is covered by the inner plate 112 and the outer plate 106, respectively. The slot 204 formed in the rolling plates 110*a*, 110*b* supports and contains the rolling member 202 therein. As such, the rolling member 202 is sized to span the thickness of the rolling plates 110*a*, 110*b*, and the framing plates 108*a*, 108*b*, 108*c*. Although several plates are described herein as an exemplary embodiment, a skilled person in the art would recognize that the functions of two or more plates may be combined into a single plate. For example, all three framing plates 108*a*, 108*b*, 108*c* may be combined as a single plate, or the inner plate 112 and the second rolling plate 110*b* may be combined as single plate. The multiple plate design allows the locking device 10 to be assembled without welding and to reduce weight.

Figure 9:
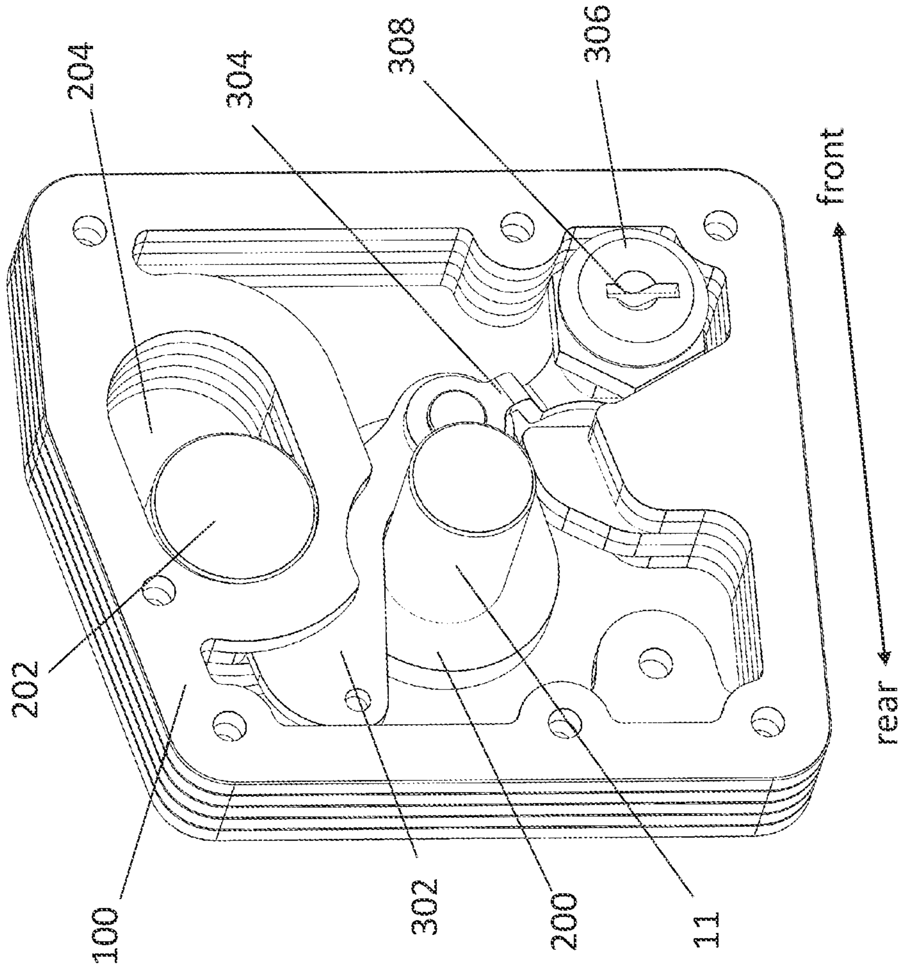
FIG. 9 is a perspective view of the locking device from the outside with the outer plate removed (the rolling member in its blocked position)
Figure 10:
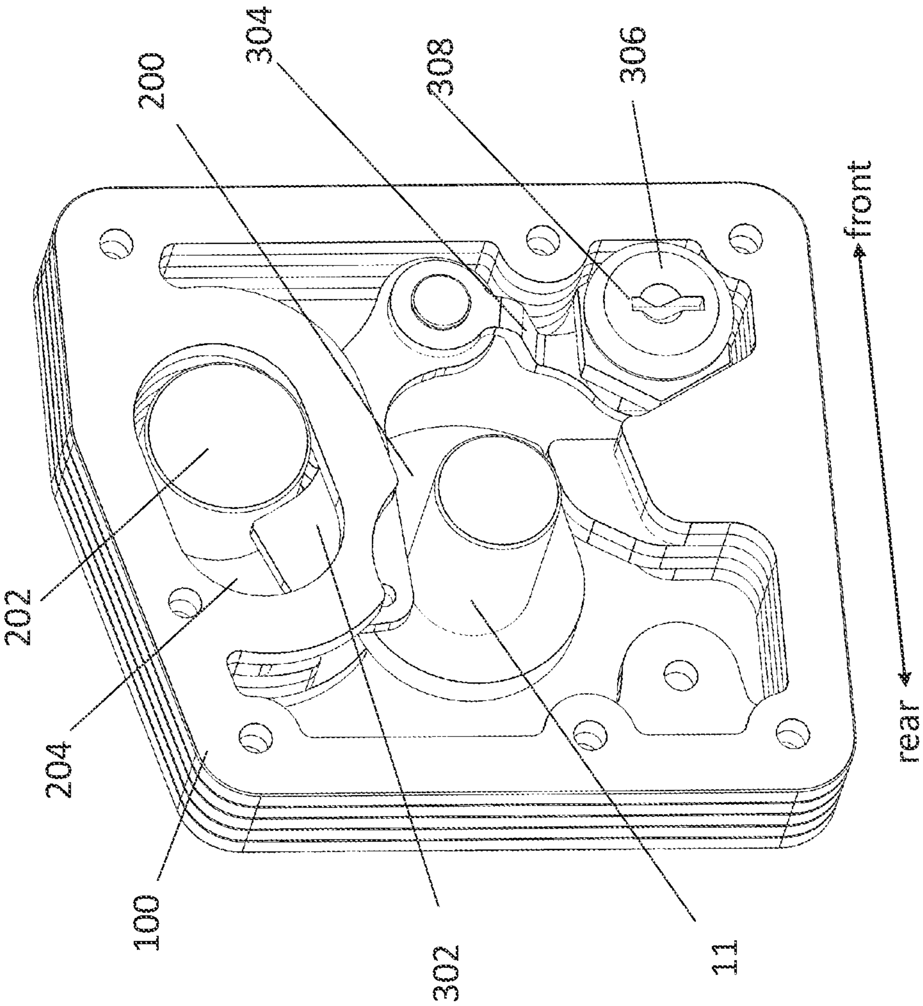
FIG. 10 is the same view of FIG. 9 with the rolling member in its release position.

The locking mechanism 10 further includes a manual release for manually opening the locking device 10. As noted above, in the upright position, the rolling member 202 sits that the bottom of the of the slot 204 (the blocked position) to block the cam 200, and thus prevent the pivotable unit 12 from rotating clockwise (as shown in FIG. 6). The manual release allows the user to manually push the rolling member 202 to the top of the slot 204 (the release position) to allow the cam 200 to rotate clockwise. As best shown in FIGS. 6-9, the manual release preferably includes a key cylinder 300 and a sliding member 302 pivotably connected to a lobe 304 on the key cylinder 300 (note that FIG. 6 includes two reference numerals 302, both indicating the same continuous sliding member, the middle part of which is behind the cam 200). The key cylinder 300 is housed in a cylinder housing 306 that is preferably fixed to the outer plate 106, such that a keyhole 308 faces the exterior of the housing 100 and the lobe 304 is contained inside the housing 100. The key cylinder 300 cannot be rotated with respect to the cylinder housing 306 unless a key (not shown) is inserted into the keyhole 308. The key cylinder 300 does not rotate with respect to the cylinder housing 306 until the key is inserted into the keyhole 308. The lobe 304 is positioned on an end portion of the key cylinder 300 opposite the keyhole 308. The lobe 304 non-rotatably connects (fixed) to and extends perpendicularly from the key cylinder 300. The sliding member 302 pivotably connects to the lobe 304 on one end, so that clockwise rotation (as shown in FIG. 10) of the key cylinder 300 also rotates the lobe 304 which pulls the sliding member 302 forwardly toward the front of the locking device 10 (unlocked position). Counter clockwise rotation of the key cylinder 300 pulls the sliding member backwardly (locked position). The sliding member 302 is shaped such that its forward movement raises the rolling member 202 to its release position (see FIGS. 10). Preferably, as shown in FIG. 8, the sliding member 302 has a narrow end 312 that is pivotably attached to the lobe 304 and a wide end 314 that is free. As the sliding member 302 slides forwardly, the wide end 314 contacts the rolling member 202 and raises the rolling member 202 to the top of the slot 204. The sliding member 302 and the cam 200 operate in parallel planes, such that they independently interact with the rolling member 202 without interfering with each other. Preferably, the sliding member 302 slides forwardly and backwardly in the same plane as the first framing plate 108*a*, while the cam 200 rotates in the same plane as the second and third framing plates 108*b* and 108*c*. That way, the sliding member 302 and the cam 200 can move freely relative to each other without interference. The sliding member 302, as best shown in FIGS. 9 and 10, rests on the shaft 11 (due to gravity when the locking device is in its upright position) and slides on top of the shaft 11 along the bottom edge of the sliding member 302. Although the key cylinder 300 is disclosed as a preferred embodiment for the manual release, a skilled person would recognize that other mechanisms for rotating the lobe 304 may suffice as the manual release.

Figure 15:
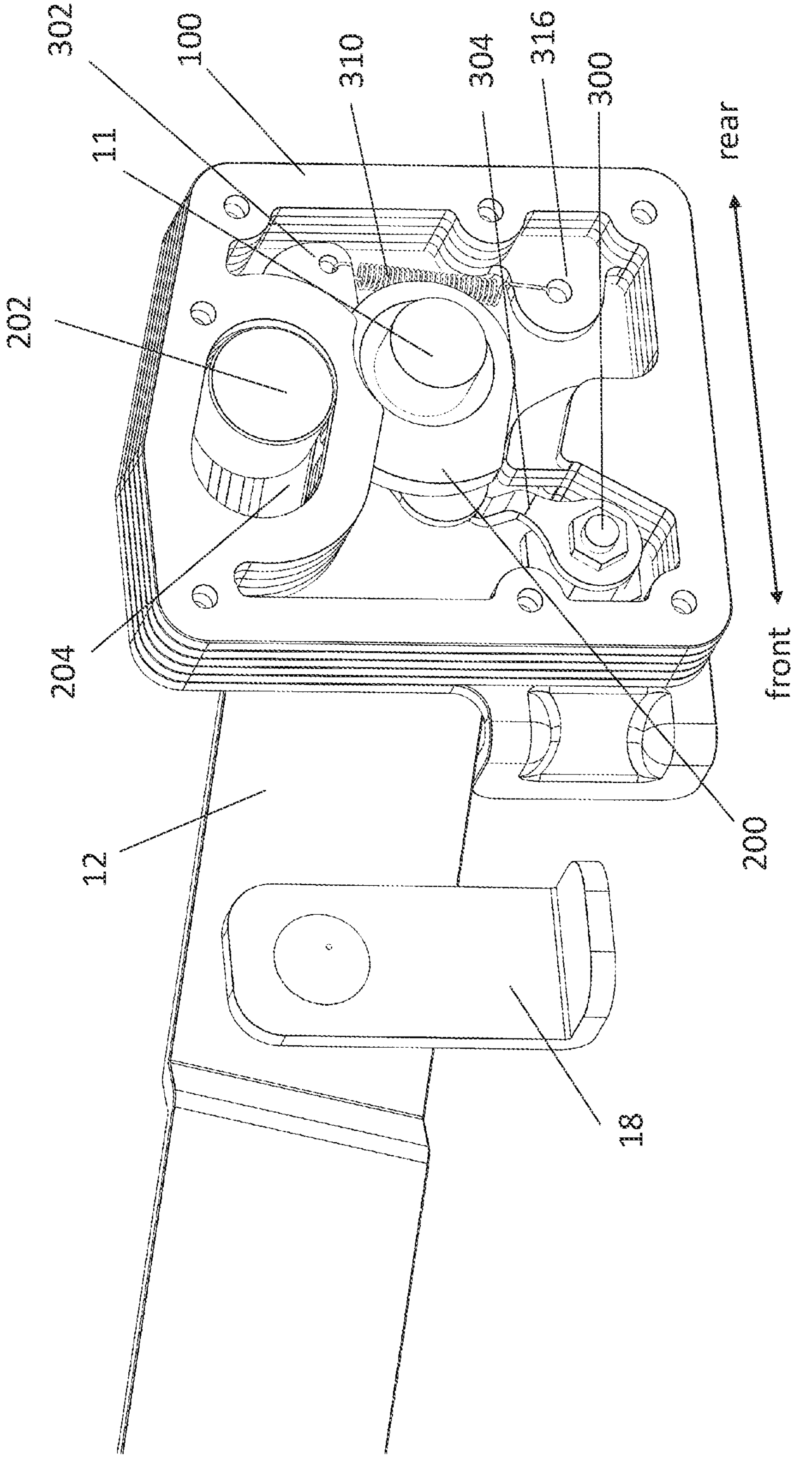
FIG. 15 is a perspective view of a second embodiment of the locking device from the inside with the inner plate removed.
Figure 16:
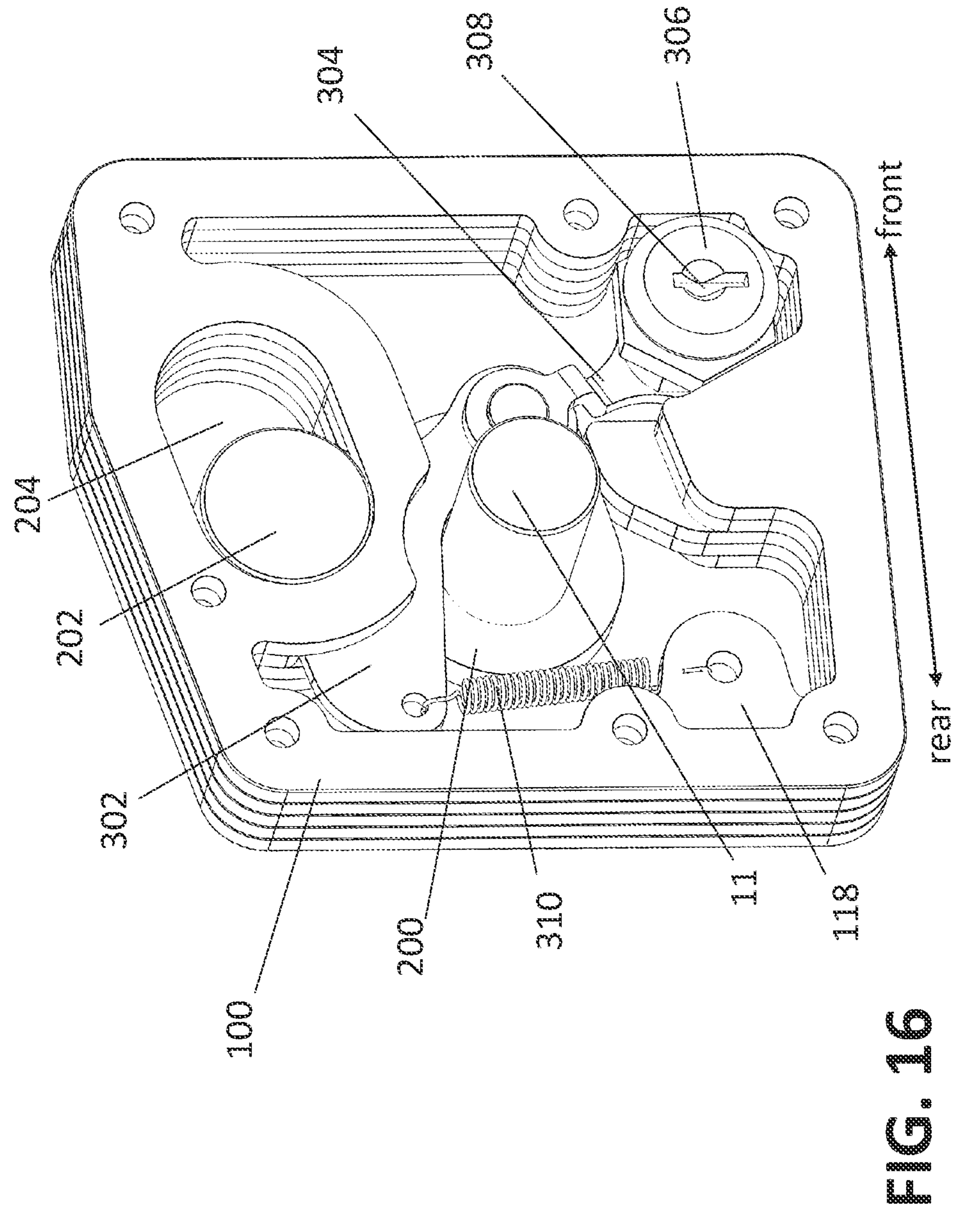
FIG. 16 is a perspective view of the second embodiment of the locking device from the outside with the outer plate removed (the rolling member in its blocked position)
Figure 17:
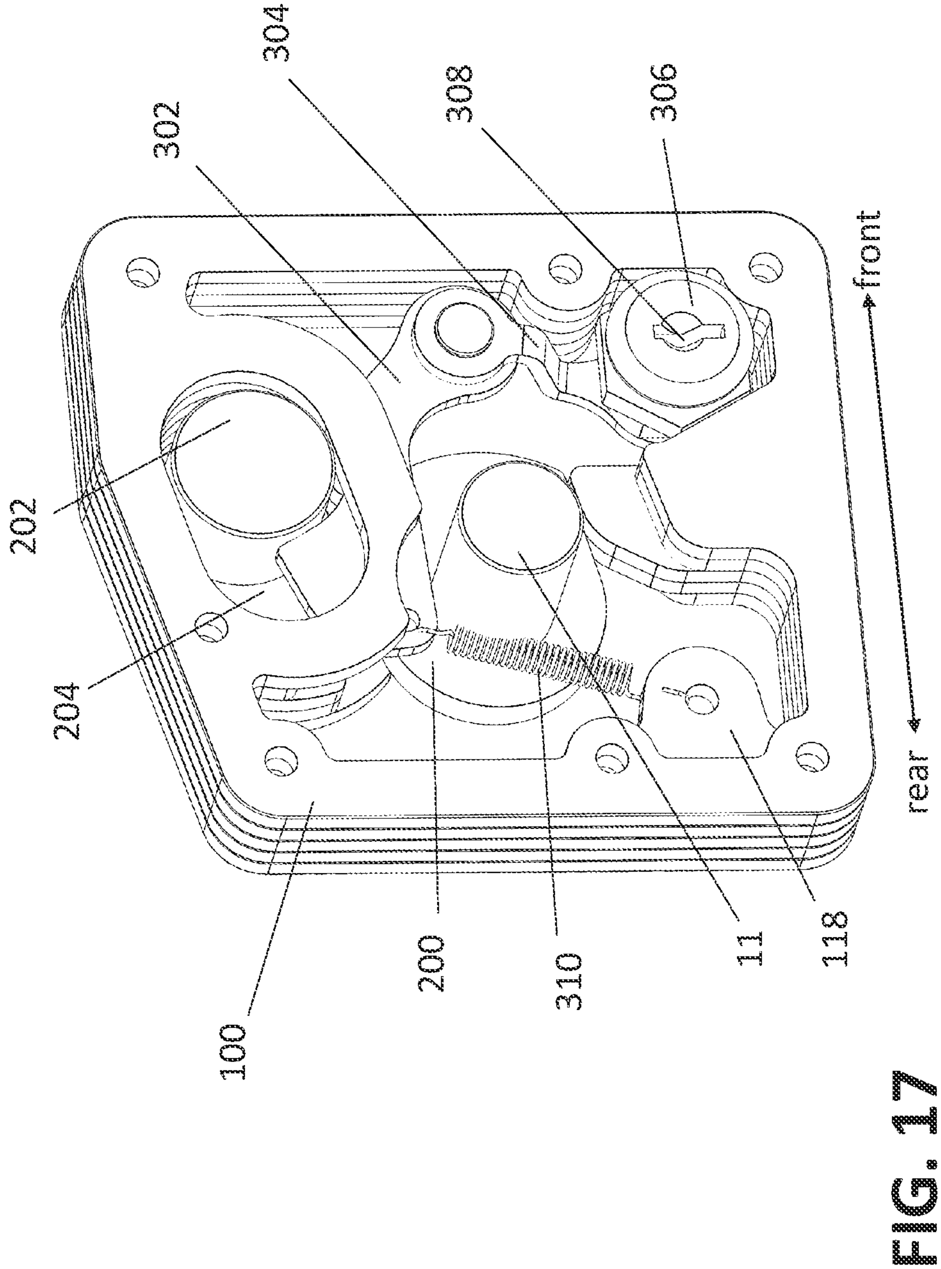
FIG. 17 is the same view as FIG. 16 with the rolling member in the release position.

In certain embodiments, as illustrated in FIGS. 15-17, a biasing member 310, such as a spring, is positioned at the large end 314 (free end) of the sliding member 302 to pull and to bias the sliding member 302 against the shaft 11 in order to maintain contact between the sliding member 302 and the shaft 11 during the sliding of the sliding member 302 between the forward and rearward position. When a spring is used, as shown in FIGS. 15-17, one end of the spring is connected to the large end 314 of the sliding member 302, while the other end of the spring connects to the housing 100. In this case, a connection pad 118 may be formed in the housing 100 for connecting to the biasing member 310. The biasing member 310 ensures that the sliding member 202 maintains contact with the shaft 11 as it slides forwardly and backwardly. Additionally, the biasing member 310 ensures that the sliding member 202 returns to its rearward position, to allow the rolling member 202 to roll to the bottom of the slot 204, when the key cylinder 300 is in its locked position.

Figure 7:
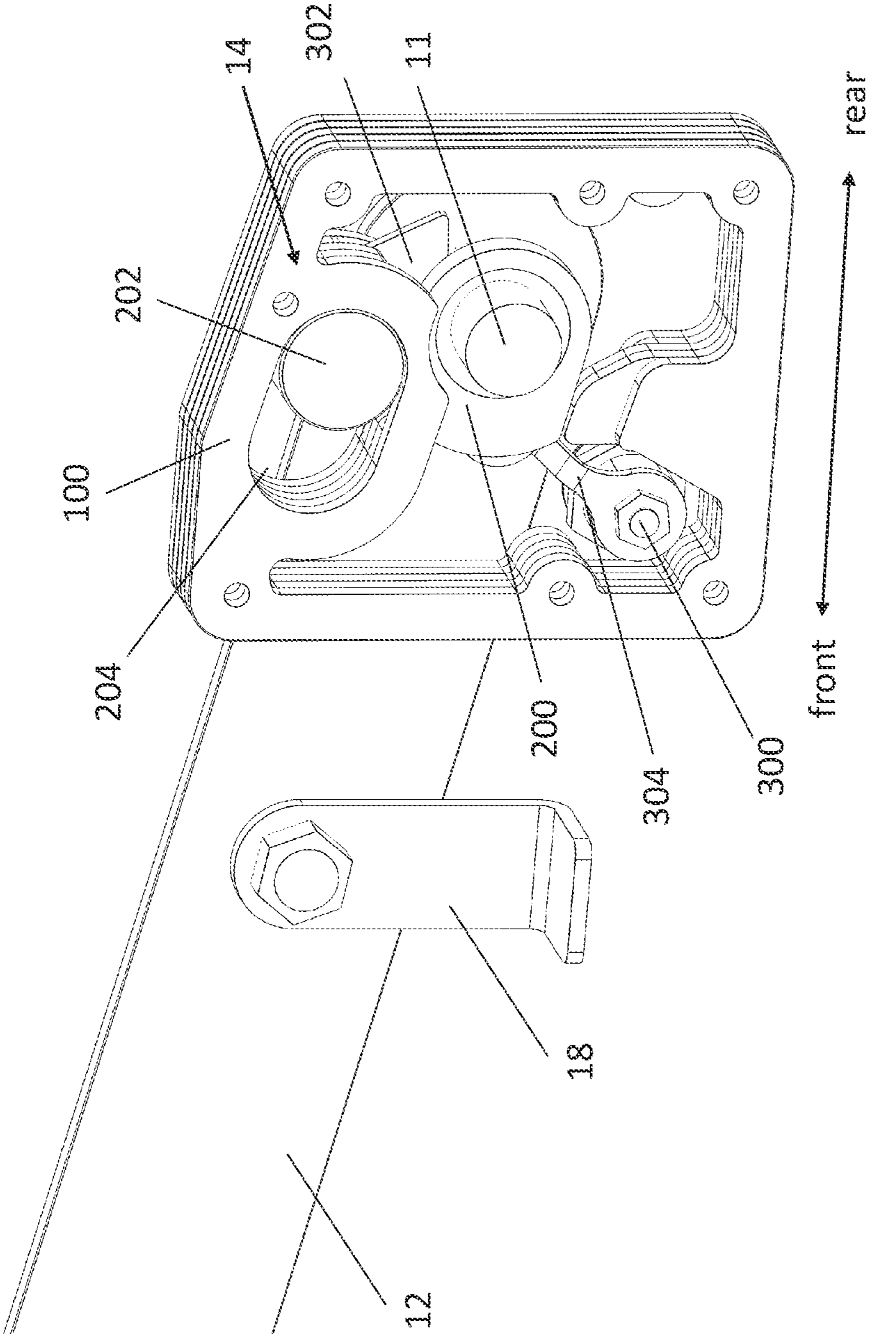
FIG. 7 is the same as FIG. 6 from a different angle.

When the locking device 10 is attached to a container 2 and the container 2 is in its upright position, the rolling member 202, due to gravity, locates at the bottom of the slot 204 (see FIGS. 6-7 and 9). When the rolling member 202 is in its blocking position at the bottom of the slot 204, the pivotable unit 12 cannot be rotated rearwardly and away from the container to its opened position (FIG. 6), because the rolling member 202 abuts the cam 200 to prevent the cam 200 from rotating.

Figure 11:
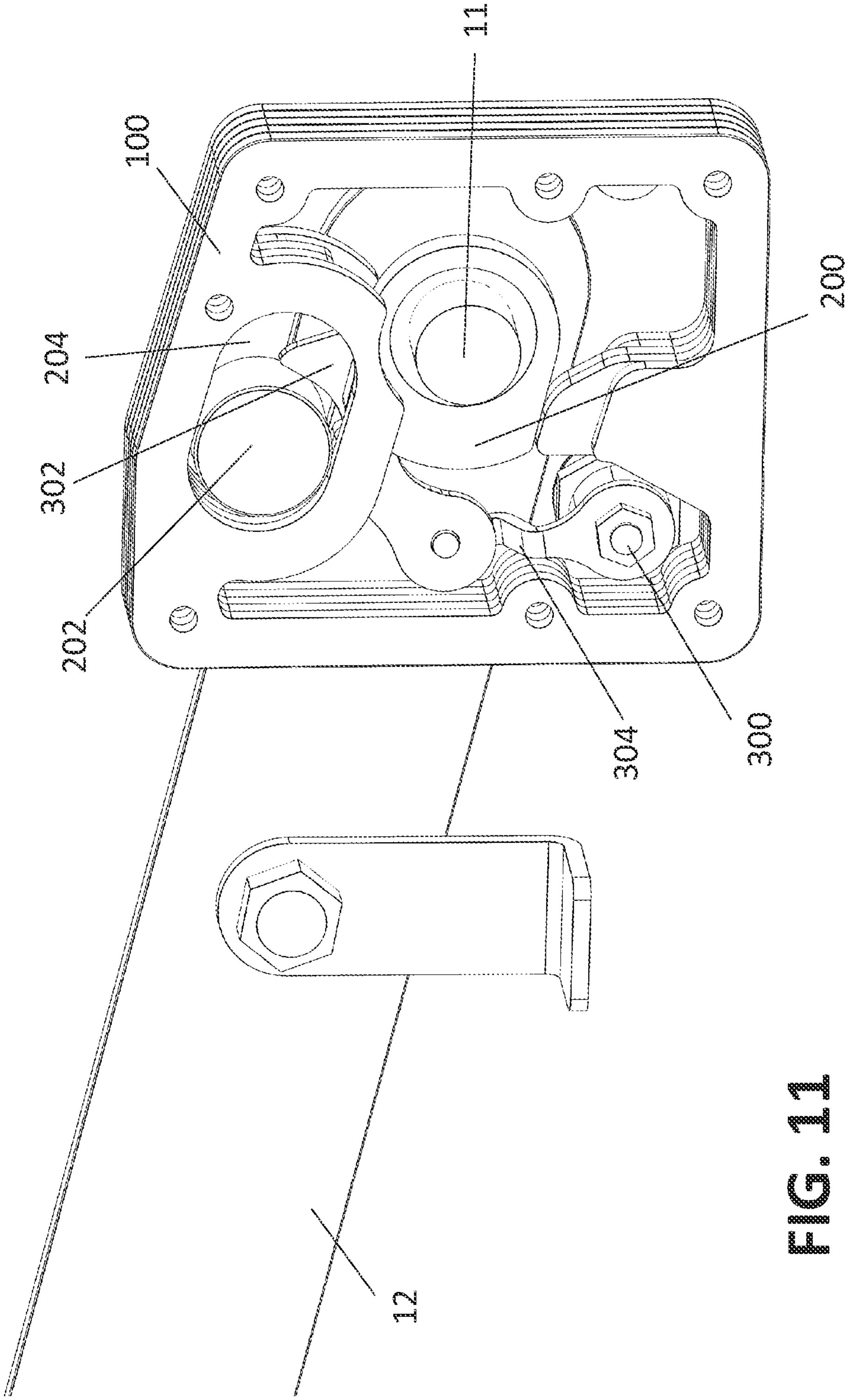
FIG. 11 is the same view of FIG. 7 with the rolling member in its release position.
Figure 12:
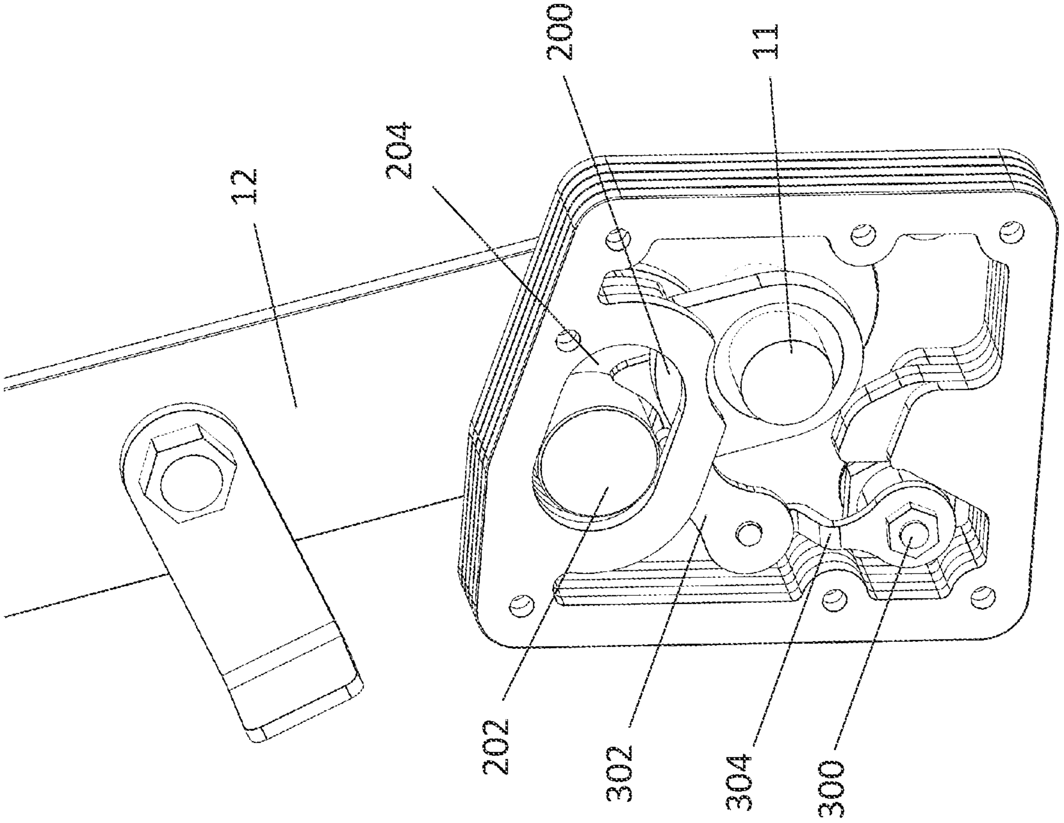
FIG. 12 is the same view as FIG. 11 with the rolling member in its release position and the pivotable arm in the opened position.

To manually open the container 2, a key may be inserted into the keyhole 308 to turn the key cylinder 300, which in turn rotates the lobe 304 forwardly. The rotation of the lobe 304 pulls the sliding member 302 forward. As the sliding member 302 moves forwardly, its wide end pushes the rolling member 202 to the top of the slot 204 (see FIGS. 10-11). In that position, the rolling member 202 no long blocks the rotation of the cam 200, thereby, allowing the pivotable unit 12 to be rotated rearwardly and away from the container to its opened position (see FIG. 12). On manual opening, the locking bar 6 may be placed in two different open positions: an intermediate open position as shown in FIG. 2 or a fully open position as shown in FIG. 3. In the intermediate open position, the pivotable unit 12 may be propped up at an acute angle with the horizontal to the front of the container 2 (obtuse angle to the rear of the container), preferably about 45° to 80°. In the fully open position, the pivotable unit 12 is rotated to the rear of the container 2 so that the pivotable unit 12 points toward the rear of the container.

Figure 19:
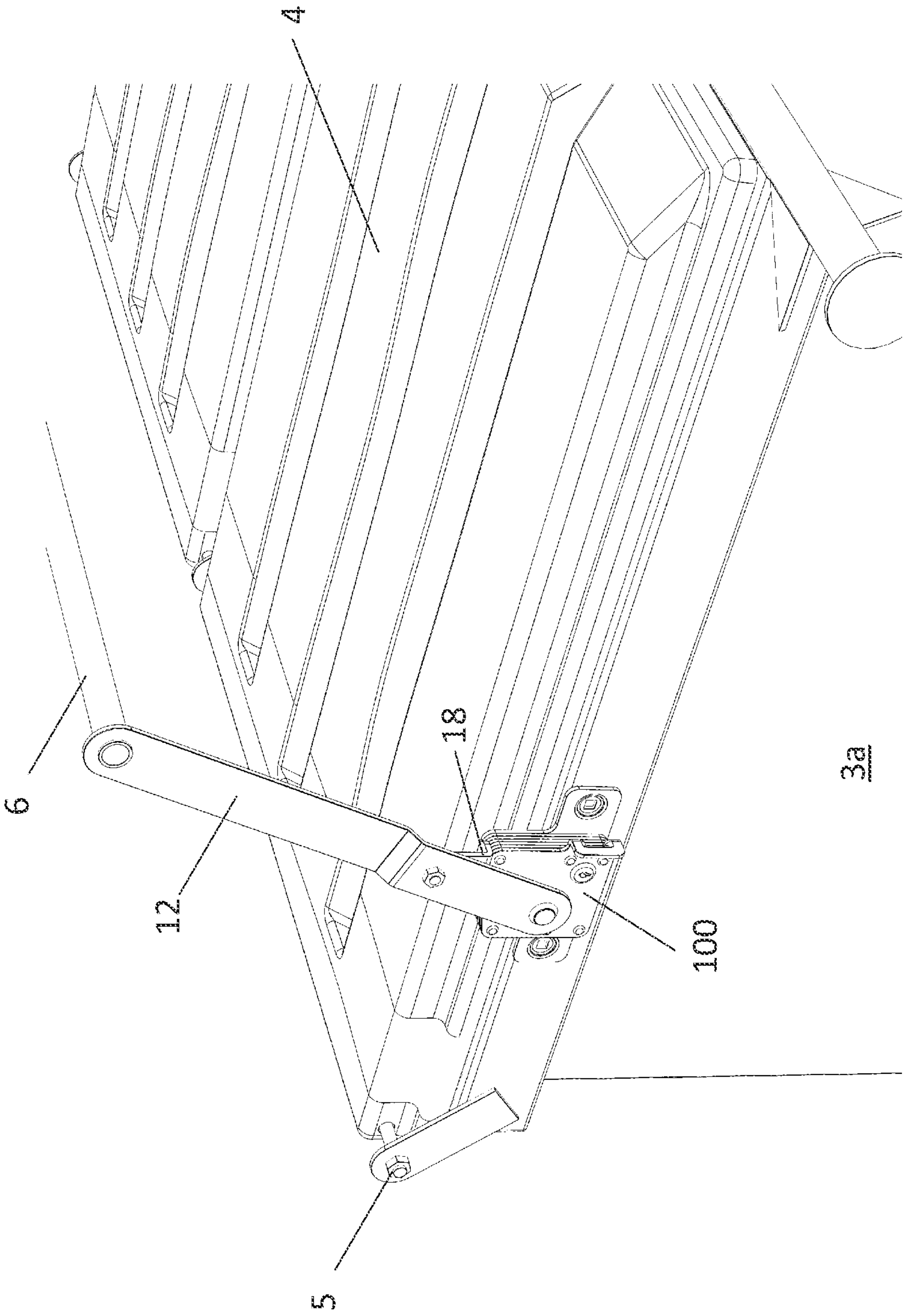
FIG. 19 is a partial view from the locking side of the waste container with the pivotable unit propped in the intermediate open position.
Figure 20:
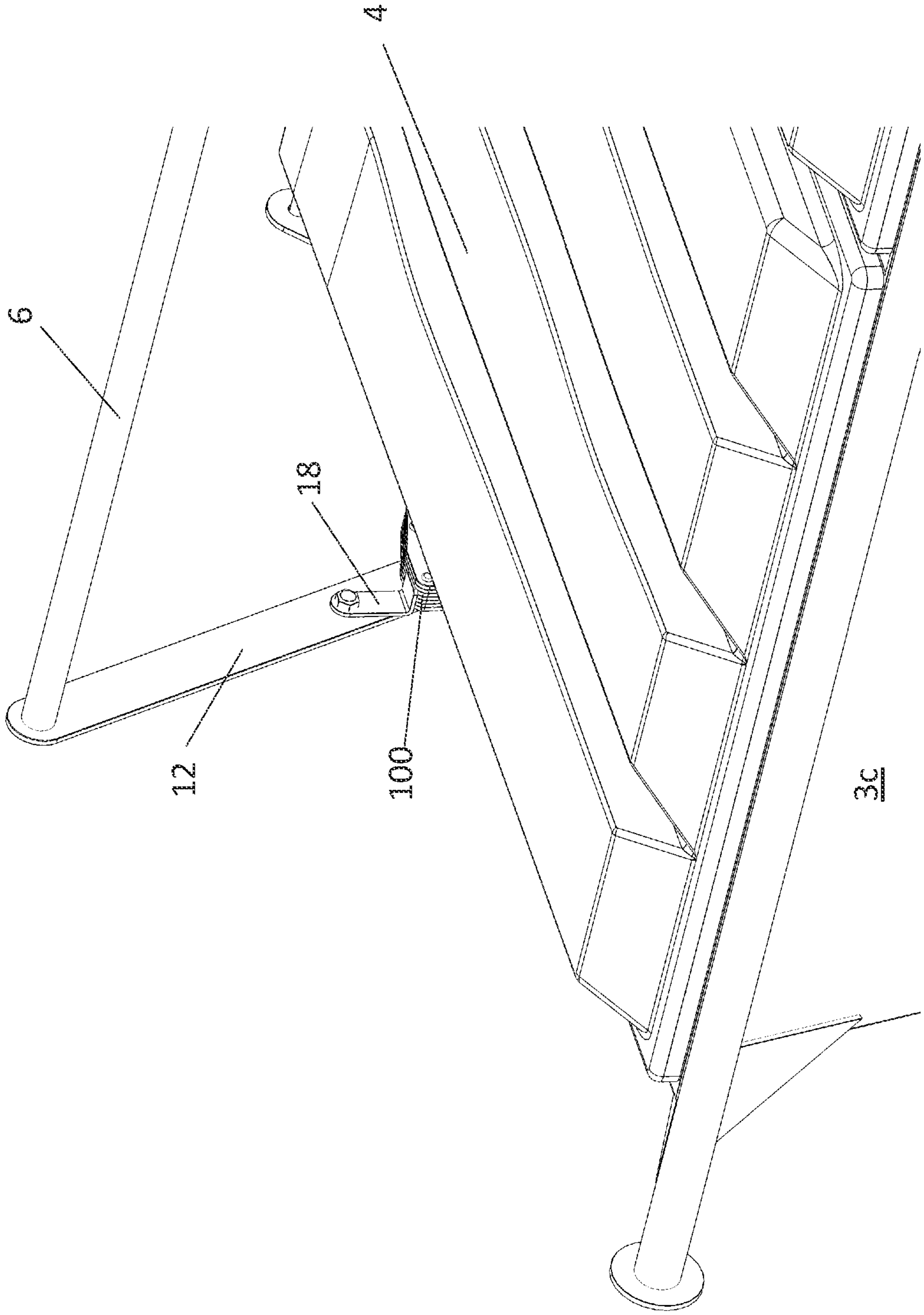
FIG. 20 is a partial view of the front side of the waste container with the pivotable unit propped in the intermediate open position.

Referring to FIGS. 19-20 showing the lock bar 6, and thus the pivotable unit 12, being placed in the intermediate position. To hold the locking bar 6 in that intermediate position, a prop bar 18 is used. As best shown in FIG. 8, the prop bar 18 is an L-shaped bar having a first leg 18*a* and a second leg 18*b*. The first leg 18*a* is rotatably mounted to the pivotable unit 12, e.g., by a bolt/nut, so that the prop bar 18 is freely rotatable on the pivotable unit 12. In the intermediate position, the second leg 18*b* of the prop bar 18 rests on top of the housing 100 (see FIGS. 19-20) so that pivotable unit 12 is propped up at an acute angle to the front of the container 2. To lower the pivotable unit 12, the prop bar 18 is swung forwardly, away from the housing 100, so that the second leg 18*b* is no longer in contact with the housing 100. In that position, the pivotable unit 12 can be lowered toward the closed position.

Figure 14:
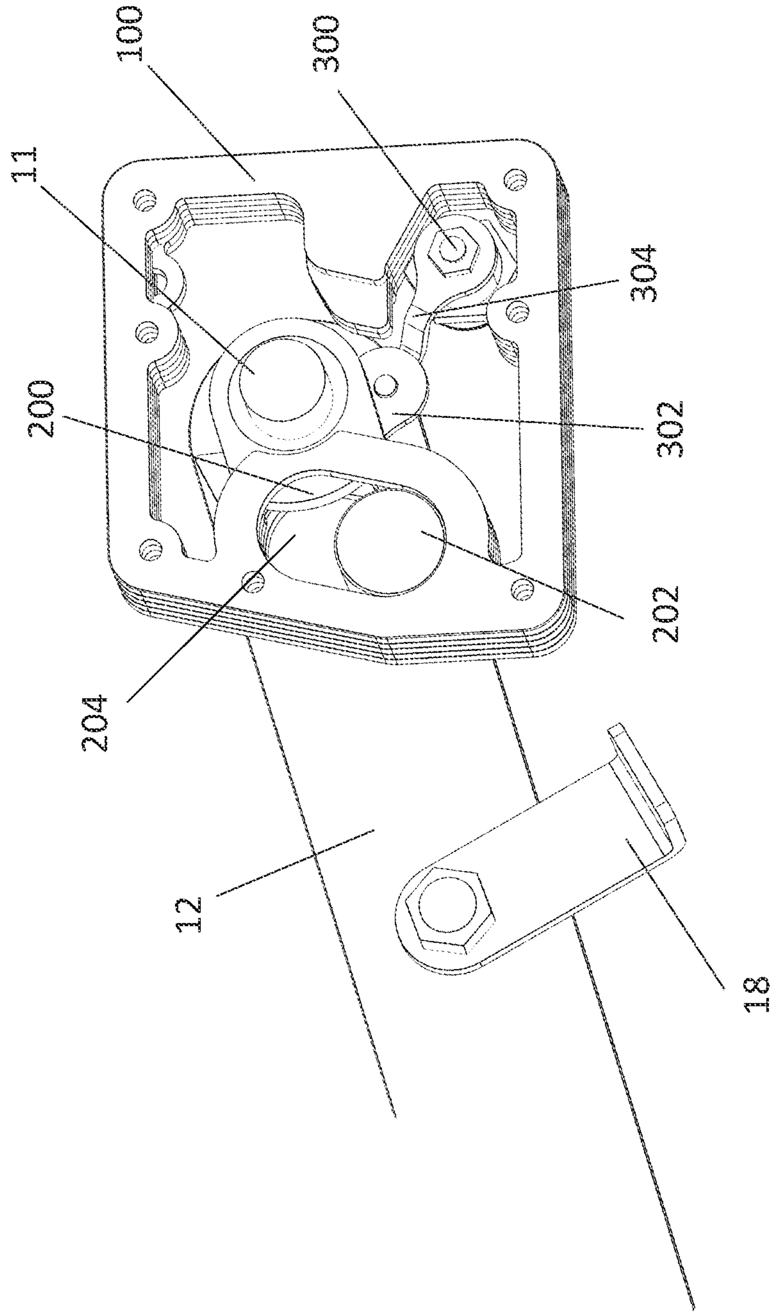
FIG. 14 is the same view as FIG. 13 with the rolling member in its release position and the pivotable arm in the opened position.

When it is desirable to remove the contents of the container 2, the container 2 may be grabbed by a lifting mechanism, e.g. of a waste collection truck (not shown), and moved from the upright position to the tilted or dumping position. When in the upright position, the rolling member 202 is in the blocking position (as shown in FIGS. 6-7 and 9). Accordingly, the pivotable unit 12 is prevented from pivoting to its open position (as noted above). However, when the waste container 2 is tipped forward, gravity pulls the rolling member 202 from the blocking position at the bottom of the slot 204 (shown in FIGS. 6-7 and 9) to the release position at the top of the slot 204 (shown in FIG. 13). In the release position, the rolling member 202 no longer obstructs the rotation of the cam 200. Consequently, the pivotable unit 12 may pivot (by gravity on the pivotable unit 12 and the locking bar 6) from the closed position to the open position, as shown in FIG. 14. The lid 4 of the waste container 2 may then swing open by gravity, permitting the contents of the waste container 2 to be emptied, preferably into the hopper on the waste collection truck. As the container 2 is returned to its upright position, the pivotable unit 12 pulls to its closed position by gravity. When the container 2 is in its upright position, gravity pulls the rolling member 202 back to its blocking position.

Although certain presently preferred embodiments of the invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

What is claimed is:

1. A locking device, comprising:

a base unit including a base member; and a pivotable unit coupled to the base unit by a shaft non-rotatably fixed to the pivotable unit, the pivotable unit is pivotable between a closed position and an open position, wherein the base unit includes a housing enclosing a locking mechanism, the housing including an angularly disposed slot therein, the locking mechanism comprising a rolling member disposed in the slot, and a cam non-rotatably fixed to a perimeter of the shaft, wherein when the rolling member is located at a bottom of the slot, the rolling member abuts the cam and blocks the cam from rotating, thereby blocking the pivotable unit from pivoting to the open position, wherein when the rolling member is located at a top of the slot, the cam is free from the rolling member to allow the pivotable unit to pivot to the open position wherein the locking mechanism further comprising a manual release configured to manually move the rolling member to the top of the slot, the manual release comprises a cylinder having a lobe extending approximately perpendicularly from one end thereof, and a sliding member resting on top of the shaft and pivotably connects to the lobe, the sliding member interacts with the rolling member such that when the sliding member slides forwardly, it raises the rolling member to the top of the top of the slot.

2. The locking device of claim 1, wherein when the locking device is in an upright position, the slot is angled relative to the horizontal at an angle of about 30 to 60°.

3. The locking device of claim 1, wherein the rolling member is a cylinder or a ball.

4. The locking device of claim 1, wherein a diameter of the rolling member is less than a width of the slot.

5. The locking device of claim 1, wherein the base unit comprises a plurality of plate-shaped members fixed together to form the housing.

6. The locking device of claim 5, the plate-shaped members include an inner plate, an outer plate, and at least one hollow plate-shaped intermediate member sandwiched between the inner plate and the outer plate, the plate-shaped members define a slot in which the rolling member is moveably disposed, and a cavity in which the cam, the shaft, and a manual release are moveably disposed.

7. A locking device, comprising:

a base unit including a base member; and a pivotable unit coupled to the base unit by a shaft fixed to the pivotable unit, the pivotable unit is pivotable between a closed position and an open position, wherein the base unit includes a housing enclosing a locking mechanism, the housing including an angularly disposed slot therein, the locking mechanism comprising a rolling member disposed in the slot; and a cam fixed to a perimeter of the shaft;

wherein when the rolling member is located at a bottom of the slot, the rolling member abuts the cam and blocks the cam from rotating, thereby blocking the pivotable unit from pivoting to the open position, wherein when the rolling member is located at a top of the slot, the cam is free from the rolling member to allow the pivotable unit to pivot to the open position, wherein the base unit comprises a plurality of plate-shaped members fixed together to form the housing, wherein the plate-shaped members include, in sequential order, an outer plate, a first rolling plate adjacent to the outer plate, a first framing plate adjacent to the first rolling plate, a second framing plate adjacent to the first framing plate, a third framing plate adjacent to the second framing plate, a second rolling plate adjacent to the third framing plate, and an inner plate adjacent to the second rolling plate.

8. The locking device of claim 7, wherein the plate-shaped members are assembled together with mechanical fasteners.

9. The locking device of claim 1, wherein the cam is formed as a flat U-shaped plate.

10. The locking device of claim 9, wherein the flat U-shaped plate comprises a broad end and a rounded end, the rounded end being proximate to the shaft such that the distance between the shaft and the rounded end is greater than the distance between the shaft and the broad end.

11. The locking device of claim 10, wherein when the rolling member is located at a bottom of the slot, a side edge of the cam abuts the rolling member.

12. A container assembly comprising a container body;

a hinged lid pivotally mounted to the body; and the locking device of claim 1 mounted to the container body, mounted to a side wall of the container body.

13. The container assembly of claim 12, further comprising a support member mounted to the container body opposing the locking device;

a pivoting arm pivotally mounted to the support member; and a locking bar having a first end fixed to the pivotable unit and a second end fixed to the pivoting arm, wherein when the pivotable unit is in the closed position, the locking bar is positioned over the hinged lid to prevent access to the container body, and when the pivotable unit is in the open position, the locking bar is spaced away from the lid to allow opening of the container.

14. A method for making a container assembly, comprising the steps of providing a container having a container body and a hinged lid pivotally mounted to the body; and mounting the locking device of claim 1 to the container body.

* * * * *